United States Patent
Gupta et al.

(10) Patent No.: US 7,481,533 B2
(45) Date of Patent: Jan. 27, 2009

(54) METHOD FOR DESIGNING MULTIFOCAL CONTACT LENSES

(75) Inventors: Amitava Gupta, Jacksonville, FL (US); Susan W. Neadle, Jacksonville, FL (US)

(73) Assignee: Johnson & Johnson Vision Care, Inc, Jacksonville, FL (US)

( * ) Notice: Subject to any disclaimer, the term of this patent is extended or adjusted under 35 U.S.C. 154(b) by 239 days.

(21) Appl. No.: 11/554,105

(22) Filed: Oct. 30, 2006

(65) Prior Publication Data

US 2008/0100798 A1    May 1, 2008

(51) Int. Cl.
*G02C 7/02*    (2006.01)
*G02C 7/06*    (2006.01)

(52) U.S. Cl. .................... 351/177; 351/161; 351/168

(58) Field of Classification Search ............... 351/161, 351/168, 177
See application file for complete search history.

(56) References Cited

U.S. PATENT DOCUMENTS

| | | | |
|---|---|---|---|
| 5,125,729 A | 6/1992 | Mercure | |
| 5,349,396 A * | 9/1994 | Roffman et al. | 351/161 |
| 2002/0044255 A1 | 4/2002 | Ye | |
| 2004/0085515 A1 | 5/2004 | Roffman et al. | |
| 2007/0258143 A1* | 11/2007 | Portney | 359/565 |
| 2008/0129962 A1* | 6/2008 | Dai et al. | 351/246 |

FOREIGN PATENT DOCUMENTS

| | | |
|---|---|---|
| EP | 0742464 A2 | 11/1996 |
| EP | 0803076 B1 | 4/1999 |
| EP | 0994376 A1 | 10/1999 |
| WO | WO 2005/124433 A1 | 12/2005 |

* cited by examiner

*Primary Examiner*—Jordan M. Schwartz

(57) ABSTRACT

The invention provides methods for designing contact lenses that takes into account pupil size and vergence. The lenses of the invention augment the eye's accommodative gain and take advantage of the eye's residual accommodation amplitude.

12 Claims, No Drawings

METHOD FOR DESIGNING MULTIFOCAL CONTACT LENSES

FIELD OF THE INVENTION

The invention relates to multifocal ophthalmic lenses. In particular, the invention provides methods for designing contact lenses that provide correction for presbyopia and that take into account pupil size and vergence.

BACKGROUND OF THE INVENTION

As an individual ages, the eye is less able to accommodate, or bend the natural lens, to focus on objects that are relatively near to the observer. This condition is known as presbyopia. Similarly, for persons who have had their natural lens removed and an intraocular lens inserted as a replacement, the ability to accommodate is absent.

Among the methods used to correct for the eye's failure to accommodate are contact lenses that have more than one optical power. In particular, multifocal contact and intraocular lenses have been developed in which zones of distance and near, and in some cases intermediate, power have been provided. However, no one of the known designs has proven to be widely successful with lens wearers.

DETAILED DESCRIPTION OF THE INVENTION AND PREFERRED EMBODIMENTS

The invention provides methods for designing a contact lenses, lenses according to the design method, and methods for producing the lenses, which lenses provide presbyopic correction by taking into account pupil size and vergence in their design. The lenses of the invention are advantageous in that their design augments the eye's accommodative gain, meaning the increase in plus power measured in diopters when the eye responds to an accommodative or convergence stimulus. Additionally, the design takes advantage of the eye's residual accommodation amplitude, or the total accommodative ability of the eye based on the age and ocular physiology of the individual.

The invention provides a method for the design of a multifocal lens comprising, consisting essentially of, and consisting of: a.) selecting a resting pupil diameter; b.) calculating a pupil diameter when viewing near objects; c.) selecting a ratio of near vision correction area to far vision correction area for a lens; d.) calculating values for the ratio as a function of an add power for viewing near and far objects using the resting and near viewing pupil diameters; and e.) adding an amount of optical convergence for the lens.

In a first step of the method of the design of the lens of the invention, the pupil size is taken into account in the following manner. A resting pupil diameter, or pupil diameter for viewing objects more than about 500 cm from the eye, is selected based on an average of population data or a measurement of an individual's pupil. The pupil diameter when viewing near objects, or objects less than about 100 cm from the eye, as a function of prescribed add power is then calculated based on the prescribed add power, the residual accommodation and the resting pupil diameter. To perform this calculation, the total add power required by the lens wearer must be determined. A portion of this add power will be supplied by the prescribed add power of the lens and a portion by the residual accommodation of the lens wearer's eye.

The residual add power may be calculated by subtracting the prescribed add power from the total add power required. A determination of the total amount of add power required will be based on optics, clinical experience that determines add powers for product which powers generally are available in the range from 1.00 to 3.00D, and the known studies of the accommodation needs of presbyopic populations as a function of age. The residual accommodation may be a physiologically determined quantity, mainly dependent on age and typically varies from 10+D for people less than about 15 years of age to less than 0.5D in those more than about 65 years old. For illustration purposes, it may be assumed that, to read clearly at 35 cm from the eye, an individual may require a total add power of 2.85D. The prescribed add power will be 1.00D and the residual add power will be 1.65D.

It is also known that there is a functional dependence between pupil size and accommodation measured at a constant luminance. Based on this, the accommodative response has been computed by obtaining the inverse of the object distance and has been measured over a wide range of light intensities. For example, such data was reported in Glen Myers, Shirin Berez, William Krenz and Lawrence Stark, *Am. J. Physiol. Regul. Integr. Comp. Physiol.*, 258: 813-819 (1990). Such data is the basis for the pupil constriction model that assumes independent linear interaction between accommodative stimulus and increase in luminance as shown by the equation:

$$A = A_0 - B - C \qquad (I)$$

wherein:

A is the pupil size;

$A_0$ is the resting pupil size;

B is 1/object distance in meters; and

C is log FL.

Measured clinically, B is 0.27 and C is 0.19. Assuming a luminance of 1.0 FL, Equation I can be rewritten as:

$$A = A_0 - 0.27D \qquad (II)$$

wherein D is the residual accommodation in the lens wearer's eye. Applying Equation II to the example above in which 2.85D is the required total add power and assuming a resting pupil diameter of 7.5 mm, Table 1 below shows the calculated values for the difference between the resting pupil diameter and pupil diameter resulting from application of Equation II.

TABLE 1

| Prescribed Add Power | Residual Accommodation | Reduction in Pupil Size | Pupil Size When Viewing Near Objects |
|---|---|---|---|
| 1.0D | 1.85D | 0.50 mm | 7.0 mm |
| 1.5D | 1.35D | 0.36 mm | 7.14 mm |
| 2.0D | 0.85D | 0.23 mm | 7.27 mm |
| 2.5D | 0.35D | 0.09 mm | 7.41 mm |

The ratio $(A_F/A_N)$ of area of the lens to be used for correcting the wearer's distance vision, or of the far zone of the lens, versus that used for correcting near vision, or the near vision zone, to be provided by the lens design may be then selected and used to calculate the area of the lens to be allocated to near and far vision optics. The selection may be based on the measured visual acuity and contrast sensitivity at far and near luminance ranges for either an individual or the average for a population of individuals. A preferred ratio for refractive optics is 70/30, in favor of the far vision zones, when viewing near objects. A preferred ratio for a diffractive optic will be 50/50.

The values for $A_F/A_N$ can be calculated as a function of add power for viewing near and far objects, the results for a ratio of 70/30 which are shown on Table 2. The area ratio in this calculation is given by the square of the ratio of diameters.

TABLE 2

| Prescribed Add Power | $A_F/A_N$(Near Objects) | $A_F/A_N$(Far Objects) |
|---|---|---|
| 1.0D | 1.89 (65:35) | 2.33 (70/30) |
| 1.5D | 2.02 (67:33) | 2.33 (70/30) |
| 2.0D | 2.13 (68:32) | 2.33 (70/30) |
| 2.5D | 2.25 (69:31) | 2.33 (70/30) |

For example, based on a pupil size of 7.5 mm when viewing distant objects and 7.0 mm when viewing near objects, the area of optic provided for far vision is $\pi(7.5/2)^2 \times 0.70$ sq. mm and the area provided for near vision is $\pi(7.5/2)^2 \times 0.30$ sq. mm. When viewing near objects, the area is reduced to $\pi(7.0/2)^2$. The ratio of the near vision area to the total optical area is $\pi(7.5/2)^2 \times 0.30/\pi(7.0/2)^2$ or $(7.5/7.0)^2 \times 0.30 = 1.072 \times 0.30 = 1.145 \times 0.3 = 0.343$ or 34.3%. Thus, 65.7% remains for the far vision zone.

Thus, the method of the invention permits the lens designer to provide a greater portion of the pupillary aperture to the retinal image of far object images without compromising the luminance of near object images. This is due to the fact that the near vision zone is placed within the pupillary area of the constricted pupil and the far vision zone is disposed within the pupillary aperture of the pupil at rest, or the unaccommodated pupil and pupillary constriction on accommodation excludes some of the far vision zone.

In another step of the method of the invention, an amount of vergence, or optical convergence, effective to bring both eyes of an individual to a common focus on a viewed object is incorporated into the lens. The amount of optical convergence added will depend upon the add power designed into the lens, with the amount of optical convergence increasing as the amount of add power increases. Typically, an amount up to about 2.0D may be added.

The optical convergence preferably is incorporated into the lens by adding a base-in prism, meaning horizontal prism with the base oriented in the nasal direction of the lens. Optical convergence may, in monovision designs, also be incorporated by adding sufficient plus power to the lens to reduce the overall accommodative need. Also, convergence may be added by decentering the center of the near vision zone from the lens' geometric center.

The preferred lens resulting from the method of the invention is a bifocal in which the optic zone contains two, radially symmetric zones: a first zone that is a central zone and a second zone that is an annular zone that surrounds the central zone. The far and near vision zones are located within the pupillary aperture of the eye at rest. The near vision zone is located within the pupillary aperture when the eye is fully accommodated and has an area of about 30 to about 50% of the area of the optic zone inside of the pupillary aperture for near vision, while the radius of the optic zone matches or exceeds the pupillary aperture for far vision. The ratio of the area of near to far vision is calculated as described above, the ratio favoring far vision when the eye is unaccommodated and near vision when the eye is accommodated. Additionally, the near vision zone is provided with a horizontal prismatic correction with the base oriented in the nasal direction. In the preferred embodiment, the location of the near vision zone is specified to be within the pupillary aperture of the accommodated eye, but no limitation is placed on its location relative to the pupil's center.

In the lenses of the invention, the optic zone, and the near and far vision zones within, may be on the front surface, or object side surface, the back surface, or eye side surface of the lens, or split between the front and back surfaces. Cylinder power may be provided on the back, or concave surface of the lens in order to correct the wearer's astigmatism. Alternatively, the cylinder power may be combined with either or both of the distance and near vision powers on the front surface or back surface. In all of the lenses of the invention, the distance, intermediate and near optical powers may be spherical or aspheric powers.

Contact lenses useful in the invention preferably are soft contact lenses. Soft contact lenses, made of any material suitable for producing such lenses, preferably are used. Illustrative materials for formation of soft contact lenses include, without limitation silicone elastomers, silicone-containing macromers including, without limitation, those disclosed in U.S. Pat. Nos. 5,371,147, 5,314,960, and 5,057,578 incorporated in their entireties herein by reference, hydrogels, silicone-containing hydrogels, and the like and combinations thereof. More preferably, the surface is a siloxane, or contains a siloxane functionality, including, without limitation, polydimethyl siloxane macromers, methacryloxypropyl polyalkyl siloxanes, and mixtures thereof, silicone hydrogel or a hydrogel, such as etafilcon A.

A preferred lens-forming material is a poly 2-hydroxyethyl methacrylate polymers, meaning, having a peak molecular weight between about 25,000 and about 80,000 and a polydispersity of less than about 1.5 to less than about 3.5 respectively and covalently bonded thereon, at least one cross-linkable functional group. This material is described in U.S. Pat. No. 6,846,892 incorporated herein in its entirety by reference. Suitable materials for forming intraocular lenses include, without limitation, polymethyl methacrylate, hydroxyethyl methacrylate, inert clear plastics, silicone-based polymers, and the like and combinations thereof.

Curing of the lens forming material may be carried out by any means known including, without limitation, thermal, irradiation, chemical, electromagnetic radiation curing and the like and combinations thereof. Preferably, the lens is molded which is carried out using ultraviolet light or using the full spectrum of visible light. More specifically, the precise conditions suitable for curing the lens material will depend on the material selected and the lens to be formed. Polymerization processes for ophthalmic lenses including, without limitation, contact lenses are well known. Suitable processes are disclosed in U.S. Pat. No. 5,540,410 incorporated herein in its entirety by reference.

The contact lenses of the invention may be formed by any conventional method. For example, the optic zone may be produced by diamond-turning or diamond-turned into the molds that are used to form the lens of the invention. Subsequently, a suitable liquid resin is placed between the molds followed by compression and curing of the resin to form the lenses of the invention. Alternatively, the zone may be diamond-turned into lens buttons.

The invention claimed is:

1. A method for designing a multifocal lens, comprising the steps of: a.) selecting a resting pupil size; b.) calculating a pupil size when viewing near objects; c.) selecting a ratio of far vision correction area to near vision correction area for a lens; d.) calculating values for the ratio as a function of an add power for viewing near and far objects using the resting and near viewing pupil diameters; and e.) adding an amount of optical convergence to the lens.

2. The method of claim 1, wherein step b.) further comprises (i) determining a total add power required by a lens wearer and (ii) calculating a residual add power.

3. The method of claim 1, wherein the ratio of far vision correction area to near vision correction area ratio is 70 to 30.

4. The method of claim 2, wherein the ratio of far vision correction area to near vision correction area ratio is 70 to 30.

5. A lens according to the method of claim 1.

6. A lens according to the method of claim 2.

7. A lens according to the method of claim 3.

8. A lens according to the method of claim 4.

9. The lens of claim 5, comprising an optic zone having a first zone and second annular zone surrounding the first zone and a horizontal prism having a base oriented in a nasal direction.

10. The lens of claim 6, comprising an optic zone having a first zone and second annular zone surrounding the first zone and a horizontal prism having a base oriented in a nasal direction.

11. The lens of claim 7, comprising an optic zone having a first zone and second annular zone surrounding the first zone and a horizontal prism having a base oriented in a nasal direction.

12. The lens of claim 8, comprising an optic zone having a first zone and second annular zone surrounding the first zone and a horizontal prism having a base oriented in a nasal direction.

* * * * *